United States Patent [19]

Moteki et al.

[11] 4,340,513

[45] Jul. 20, 1982

[54] POLYOLEFIN RESIN COMPOSITION

[75] Inventors: Tsutomu Moteki; Kunihiro Yamaguchi, both of Ichiharashi; Yoshikazu Nakajima, Musashinoshi, all of Japan

[73] Assignees: Chisso Corporation, Osaka; Kabushiki Kaisha Mikuni Seisakusho, Tokyo, both of Japan

[21] Appl. No.: 156,096

[22] Filed: Jun. 3, 1980

[30] Foreign Application Priority Data

Aug. 28, 1979 [JP] Japan .................................. 54/109438

[51] Int. Cl.$^3$ .................... C08L 1/02; C08L 21/00; C08L 53/00; C08L 93/00

[52] U.S. Cl. ................................. 524/13; 524/274; 524/499

[58] Field of Search ....................... 260/27 R, 17.4 CL

[56] References Cited

U.S. PATENT DOCUMENTS

| | | | |
|---|---|---|---|
| 3,382,142 | 5/1968 | Hine et al. | 260/17.4 CL |
| 3,654,005 | 4/1972 | Higgins et al. | 260/27 R |
| 3,663,488 | 5/1972 | Kail | 260/27 R |
| 3,664,981 | 5/1972 | Mahlman | 260/27 R |
| 3,741,924 | 6/1973 | Okita et al. | 260/27 R |
| 3,772,410 | 11/1973 | Lal et al. | 260/27 R |
| 4,190,565 | 2/1980 | Cook et al. | 260/27 R |

FOREIGN PATENT DOCUMENTS

| | | | |
|---|---|---|---|
| 552348 | 1/1958 | Canada | 260/17.4 CL |
| 2206756 | 8/1973 | Fed. Rep. of Germany | 260/17.4 CL |

*Primary Examiner*—Ronald W. Griffin
*Attorney, Agent, or Firm*—Fred Philpitt

[57] ABSTRACT

A polyolefin resin composition having superior strength, rigidity, workability, dimensional stability, etc. is provided by blending 0.3 to 4.0% by weight of at least one member selected from rosins, similar materials to rosins, derived therefrom, petroleum resins and mixtures of the foregoing members, 0.5 to 4.0% by weight of a plasticizer and 15 to 60% by weight on dry basis, of finely ground vegetable fibers to a polyolefin resins or resins, all of the above percentages being based on the weight of the composition. Further, 1 to 30% by weight of an inorganic filler and/or 1 to 10% by weight of a synthetic rubber can be blended thereto.

6 Claims, No Drawings

POLYOLEFIN RESIN COMPOSITION

BACKGROUND OF THE INVENTION

1. Field of the Invention

This invention relates to a thermoplastic resin composite composition based upon polyolefin resins. More particularly, it relates to a molding resin composition suitable to such an application as industrial materials or the like which comprises mainly polypropylene and vegetable fibers.

2. Field of the Invention

Polyolefin resins incorporated with inorganic fillers such as asbestos, talc, calcium carbonate and the like, have been known as a raw material for injection molding. On the other hand, as for those incorporated with organic materials such as wooden flour, a mixture of wooden flour and glass fibers, some have been known and practically used in part, but poor in the point of general purpose, because of their inferiority in physical properties such as mechanical strength and in moldability. Thus, few could have been used in a wide variety of applications.

We have been earnestly studying to improve the abovementioned points in question and developed a molding material which is fit for practical use in all points of physical properties, moldability and cost, and as a result have found a method for producing a molding composition which is superior in strength, rigidity, moldability, dimensional stability, etc. and inexpensive in cost and attained the present invention.

SUMMARY OF THE INVENTION

The present invention resides in:

a composition comprising a polyolefin resin or resins, having 0.3 to 4.0% by weight of at least one member selected from the group consisting of rosins, similar materials to rosins, derived therefrom, petroleum resins and mixtures of the foregoing members, 0.5 to 4.0% by weight of a plasticizer and 15 to 60% by weight on dry basis, of finely ground vegetable fibers, blended to said polyolefin resin or resins, all of the above percentages being based on the weight of said composition.

Further the present invention resides also in:

a composition having 1 to 30% by weight of an inorganic filler and/or 1 to 10% by weight of a synthetic rubber, added further to the above-mentioned composition.

DETAILED DESCRIPTION OF THE INVENTION

Polyolefin resins referred to herein mean polypropylene having mainly isotactic structure, low density polyethylene, high density polyethylene, copolymers of the foregoing members with other olefins and mixtures thereof, and mainly propylene polymers are most suitable.

As for rosins, those obtained by subjecting a pine resin to steam distillation to remove volatile turpentine oil, are representative, but, in addition, in the present invention, derivatives of the above-mentioned materials such as hydrogenated rosin, disproportionated rosin, glyceride of rosin, maleic acid-modified rosin, etc. are also useful. These materials have softening points or melting points in the range of 50°–130° C.

Petroleum resins are resins produced by polymerizing a mixture of unsaturated hydrocarbons obtained at the time of petroleum refining, petroleum cracking, etc. in the presence of a catalyst. They have softening points to an extent of from 60° to 120° C. and thus physical properties similar to those of rosins or their derivatives.

Plasticizers referred to herein mean those which have been mainly used as the plasticizers for polyolefins. Butyl stearate and polyisobutylene are representative, but in addition, phthalates of higher alcohols which are plasticizers for polyvinyl chloride resins are also useful.

As vegetable fibers, finely ground pulp, finely ground used papers such as newspapers, magazines, corrugated cardboard, etc., finely ground non-woven fabrics, cotton cloths, etc. can be used advantageously in the point of cost.

Fiber length varies depending upon used papers, etc. employed, but it is necessary that fine-grinding or pulverization be carried out sufficiently and fibers must be freed from entanglement therebetween. Further, fine-grinding or pulverization of fibers can be advantageously carried out by pulverizing those materials having been cut into suitable sizes, with a turbo-cutter or the like in dry state. It is generally preferable to set the fiber length in the range of 300 μm or less, and set the fiber diameter in the range of 30 μm or less.

As for inorganic fillers, those which have been generally used, e.g. calcium carbonate, magnesium silicate, aluminum silicate, barium sulfate, calcium sulfate, etc. are suitable. However, those having a mean particle size of 10 micron or less are preferable.

As for synthetic rubbers, ethylene-propylene rubber (EPR), ethylene-propylene-terpolymer containing a third component, butyl rubber, polybutadiene rubber, etc. are useful. For mixing the above-mentioned various blending materials uniformly to polyolefin resins, apparatuses as well as processes which have been generally employed in mixing resins with fillers may be adopted as they are. As for the apparatuses, Banbury mixer, roll mixer, kneader, extruder, high speed revolving mixer, or combinations of the foregoing members are mentioned. In the case of materials which have been obtained by blending vegetable fibers to a polyolefin resin without adding a rosin or a plasticizer, dispersion of vegetable fibers hardly becomes uniform; strength, etc. are inferior because of poor affinity between the polyolefin resin and the vegetable fibers; the materials lack in uniformity of quality; and only those materials poor in practical value are obtained. In this case, for ensuring strength and uniformity of quality to a certain extent, it is possible to attain the object by reducing the amount of vegetable fibers blended, but since physical properties such as rigidity, dimensional stability, heat resistance, to-be-painted properties, etc. are reduced, it is not possible to attain the object sufficiently. For improving the dispersion properties of vegetable fibers and also improving binding power thereof with polyolefin resins to increase the amount of the vegetable fibers blended, a combination of rosin or a similar substance and a plasticizer in the composition of the present invention is extremely effective. When these materials are not added, the upper limit of the amount of vegetable fibers blended is about 20% by weight, whereas when these materials are used, it is possible to blend vegetable fibers in an amount up to about 60% by weight. As for the total amount of a rosin or the like and a plasticizer necessary to create this effect, even so small an amount as about 1.0% will produce the effectiveness. The amount of the vegetable fibers blended in the composition of the present invention, is in the range of 15 to 60%, preferably 20 to 55%. An amount less than 15% provides only small effect of improvement in the point of rigidity, dimensional stability, heat resistance, to-be-painted properties, etc. An amount greater than 60% makes the flowability worse even if a plasticizer or the like is added, raises a problem in the point of moldability and at the same time, results in a brittle product. Thus, practical value will become poor.

When vegetable fibers and inorganic fillers are simultaneously blended, improvement effect can be attained, in the point of physical properties, e.g. flame retardancy, rigidity, heat resistance, etc. Further, by adding a small amount of an inorganic filler, the effectiveness for improving the dispersion properties of vegetable fibers can be recognized, and as a result, impact strength is also improved. The amount of inorganic fillers blended is in the range of 1–30%. In case improvement of dispersion properties of vegetable fibers is aimed, even a relatively small amount of the fillers may be effective, but in case improvement of physical properties is aimed, a relatively large amount is preferable. At any rate, the ratio of fillers to vegetable fibers is 1:1 at the highest. If inorganic fillers are added more, the features of the composition of the present invention such as dimensional stability will be lost.

When synthetic rubbers are blended in the composition of the present invention, heat resistance, etc. are somewhat reduced, but impact strength can be improved. The amount thereof added is in the range of 1 to 10%. If the amount is less than 1%, the effectiveness is small. If it exceeds 10%, heat resistance lowers greatly and also rate of mold shrinkage decreases. Further, in this case, the improvement of impact strength by way of synthetic rubbers is more effective due to the presence of additives such as rosin or the like than the case where these are not added. It goes without saying that the physical properties of the composition of the present invention is determined by the selection of polyolefin resins as the base, in addition to the selection of the amount of fillers blended. For example, when a weight is to be put on heat resistance and rigidity, polyporpylene is suitable, but when flexibility is to be provided, it is possible to blend a small amount of low density polyethylene.

The composition of the present invention can be molded according to various molding processes such as extrusion molding, injection molding or the like, but it is especially suitable to fabrication by way of vacuum molding or the like, of once prepared sheets. The composition can be used advantageously for interior parts of automobiles, and parts of electric sound apparatuses by making the most of its dimensional stability, to-be-painted properties, etc.

More detailed explanation will be given to the resin composition of the present invention by way of the following non-limitative specific examples.

EXAMPLES 1-2 AND COMPARATIVE EXAMPLE

The following ingredients were blended together in the proportions shown in Table 1:

As a polyolefin resin, a blend of a polypropylene block copolymer having a melt flow rate of 3.0 and an ethylene content of 8.0% by weight and a high density polyethylene having a melt index of 0.4, and a number of ethyl branches per 1000 carbon atoms of 2.5; as a plasticizer, butyl stearate; as a rosin type compound, an ester gum (a glycerine ester of a rosin); as a petroleum resin, Arcon P-125 supplied by Arakawa Chemical Industry Co., Ltd.; and as vegetable fibers, newspaper finely pulverized with a turbocutter. The resulting blended materials were mixed by a kneader heated to 170° C. When the polyolefin resins melted and began to permeate into the vegetable fibers, extrusion was carried out from an extruder at a resin temperature of 190° C. to produce pellets. Test specimens were prepared using them to measure their physical properties. The results are shown in Table 1. For comparison's sake, compositions which do not satisfy the constitutional requirement of the present invention i.e. a first composition of a polyolefin and only vegetable fibers (Comparative example 1), a second composition obtained by adding as a plasticizer, butyl stearate to the first composition (Comparative example 2), a third composition obtained by adding a petroleum resin to the first composition, in place of a plasticizer (Comparative example 3) and a fourth composition of polypropylene (60%) and as an inorganic filler, talc (40%) (Comparative example 4) were prepared and their physical properties were similarly measured. The results are also shown in Table 1.

TABLE 1

|  | Examples | | Comparative examples | | | |
|---|---|---|---|---|---|---|
|  | 1 | 2 | 1 | 2 | 3 | 4 |
| Blending ratio (% by weight) | | | | | | |
| Polypropylene | 38 | 38 | 40 | 38 | 38 | 60 |
| High density polyethylene | 10 | 10 | 10 | 10 | 10 | |
| Vegetable fibers | 50 | 50 | 50 | 50 | 50 | Talc |
| Butyl stearate | 1 | 1 | — | 2 | — | |
| Arcon P-125 | 1 | — | — | — | 2 | 40° |
| Ester gum | — | 1 | — | — | — | |
| Physical properties* | | | | | | |
| Density (g/cm$^3$) | 1.12 | 1.12 | 1.12 | 1.12 | 1.12 | 1.25 |
| Tensile strength (kg/cm$^2$) | 334 | 335 | 230 | 253 | 270 | 325 |
| Elongation (%) | 5 | 4 | 3 | 4 | 4 | 7 |
| Bending modulus ($\times 10^4$Kg/cm$^2$) | 3.3 | 3.4 | 3.3 | 2.9 | 3.5 | 4.3 |
| Izod impact strength (Kgcm/cm$^2$) | 3.4 | 3.1 | 2.7 | 2.9 | 2.8 | 3.0 |
| Heat distortion temperature (°C.) | 135 | 136 | 138 | 128 | 130 | 140 |
| Rate of mold shrinkage (%) | 0.41 | 0.45 | 0.43 | 0.44 | 0.39 | 1.04 |

*Measurement method is based on JIS

From Table 1, it is seen that the composition obtained by blending 50% by weight of vegetable fibers has a rate of mold shrinkage less than a half of that of the composition obtained by blending 40% by weight of talc as an inorganic filler, and thus a great improvement has been attained. Among the compositions in which vegetable fibers are blended, and the one obtained by blending a plasticizer alone or the one obtained by blending a petroleum resin alone (Comparative examples 2 and 3) do not exhibit improvement so much in the physical properties, but Examples 1 and 2 in which a plasticizer and a petroleum resin or a rosin derivative are simultaneously used, exhibit remarkable improvement in the tensile strength, and Izod impact strength, i.e. effectiveness of the composition of the present invention.

EXAMPLES 3-5

In addition to the raw materials used in Example 1, calcium bicarbonate having a mean particle size of 3 μm was used, and blends having proportions indicated in Table 2 were then pelletized as in Example 1. Test pieces were prepared from the pellets, to measure the physical properties. The results are indicated in Table 2 (Examples 3, 4 and 5).

TABLE 2

|  |  | Example |  |  |  |  |  |  |
|---|---|---|---|---|---|---|---|---|
|  |  | 3 | 4 | 5 | 6 | 7 | 8 | 9 |
| Blending ratio (% by weight) | Polypropylene | 38 | 38 | 38 | 35 | 33 | 35 | 33 |
|  | High density polyethylene | 10 | 10 | 10 | 10 | 10 | 10 | 10 |
|  | EPR | — | — | — | 3 | 5 | 3 | 5 |
|  | Vegetable fibers | 45 | 40 | 30 | 50 | 50 | 40 | 40 |
|  | Calcium carbonate | 5 | 10 | 20 | — | — | 10 | 10 |
|  | Butyl stearate | 1 | 1 | 1 | 1 | 1 | 1 | 1 |
|  | Arcon P-125 | 1 | 1 | 1 | 1 | 1 | 1 | 1 |
| Physical properties* | Density (g/cm$^2$) | 1.13 | 1.15 | 1.18 | 1.12 | 1.12 | 1.15 | 1.15 |
|  | Tensile strength (Kg/cm$^2$) | 330 | 323 | 314 | 337 | 330 | 319 | 318 |
|  | Elongation (%) | 6 | 7 | 7 | 6 | 8 | 8 | 10 |
|  | Bending modulus ($\times 10^4$ Kg/cm$^2$) | 3.2 | 2.9 | 2.8 | 3.2 | 3.0 | 2.9 | 2.7 |
|  | Izod impact strength (Kgcm/cm$^2$) | 3.5 | 3.9 | 4.2 | 3.6 | 4.1 | 4.1 | 4.5 |
|  | Heat distortion Temperature (°C.) | 137 | 134 | 135 | 134 | 128 | 131 | 125 |
|  | Rate of mold shrinkage (%) | 0.43 | 0.55 | 0.63 | 0.44 | 0.46 | 0.57 | 0.60 |

It is evident from Table 2, that rate of mold shrinkage becomes somewhat greater by blending calcium carbonate, but Izod impact strength is improved and elongation becomes greater and thus the physical properties are improved.

EXAMPLES 6-9

To the same compositions as those of Examples 1 and 4 was blended therein an ethylene-propylene rubber (EPR) having an ethylene content of 80% and a melt flow rate of 7.0 in a proportion of 3% or 5% by weight. The resulting blends were pelletized under the same conditions as in Example 1. The physical properties of the resultant pellets are indicated in Examples 6, 7, 8 and 9 in Table 2. According to this Table, improvements in the elongation and Izod impact strength are seen by blending EPR. This fact is common to both the product having calcium carbonate blended and the product having none blended, but there is a tendency that rate of mold shrinkage becomes greater and bending modulus is reduced.

The pellets of Examples 7 and 9 were extruded from a T-die into a sheet having a thickness of 2 mm using a 50 mm double-screw extruder set to 190° C., which sheet was then led to the nip between two rolls having a diameter of 250 mm and set to 70° C. The resultant sheets were subjected to vacuum molding by reheating with a vacuum molding machine equipped with a box-form mold having a length of 600 mm, a width of 450 mm and a maximum depth of draw of 100 mm, until the sheets reached a temperature of 160° C. As a result, excellent molded articles were obtained.

EXAMPLES 10-13

The physical properties of a product obtained by substituting DOP for butyl stearate in Example 1 (Example 10), a product obtained by substituting talc (composed mainly of magnesium silicate) for calcium carbonate in Example 4 (Example 11), and products obtained by substituting polybutadiene rubber (RB 8.20 made by Japan Synthetic Rubber Co., Ltd.) for EPR in Examples 7 and 9 (Examples 12 and 13) are shown in Table 3.

TABLE 3

|  | Examples |  |  |  |
|---|---|---|---|---|
|  | 10 | 11 | 12 | 13 |
| Density (g/cm$^3$) | 1.12 | 1.15 | 1.12 | 1.15 |
| Tensile strength (Kg/cm$^2$) | 336 | 325 | 328 | 317 |
| Elongation (%) | 4 | 6 | 8 | 9 |
| Bending modulus $\times 10^4$ Kg/cm$^2$) | 3.2 | 3.1 | 2.9 | 2.7 |
| Izod impact strength (Kgcm/cm$^2$) | 3.3 | 3.8 | 4.0 | 4.3 |
| Heat distortion temperature (°C.) | 136 | 135 | 126 | 125 |
| Rate of mold shrinkage (%) | 0.46 | 0.56 | 0.47 | 0.58 |

It is seen from the results of Table 3 that even when the kinds of blended materials are varied within the range of the present invention, there is not so large a difference in the effectiveness.

What is claimed is:

1. A molding resin composition comprising a blend of
   (1) 0.3 to 4.0% by weight of a member selected from the group consisting of
      (a) rosins and products derived from rosins,
      (b) petroleum resins, and
      (c) mixtures of (a) and (b),
   (2) 0.5 to 4.0% by weight of a plasticizer,
   (3) 15 to 60% by weight, on a dry basis, of finely ground vegetable fibers, and
   (4) a blend of a polypropylene block copolymer and a high density polyethylene making up the remainder, all of the above percentages being based on the weight of said composition.

2. A molding resin composition comprising a blend of
   (1) 0.3 to 4.0% by weight of a member selected from the group consisting of
      (a) rosins and products derived from rosins,
      (b) petroleum resins, and
      (c) mixtures of (a) and (b),
   (2) 0.5 to 4.0% by weight of a plasticizer,
   (3) 15 to 60% by weight, on a dry basis, of finely ground vegetable fibers, (4) 1 to 30% by weight of an inorganic filler, and
(5) a blend of a polypropylene block copolymer and a high density polyethylene making up the remainder, all of the above percentages being based on the weight of said composition.

3. A molding resin composition comprising a blend of
(1) 0.3 to 4.0% by weight of a member selected from the group consisting of
   (a) rosins and products derived from rosins,
   (b) petroleum resins, and
   (c) mixtures of (a) and (b),
(2) 0.5 to 4.0% by weight of a plasticizer,
(3) 15 to 60% by weight, on a dry basis, of finely ground vegetable fibers,
(4) 1 to 10% of a synthetic rubber, and
(5) a blend of a polypropylene block copolymer and a high density polyethylene making up the remainder, all of the above percentages being based on the weight of said composition.

4. A molding resin composition comprising a blend of
(1) 0.3 to 4.0% by weight of a member selected from the group consisting of
   (a) rosins and products derived from rosins,
   (b) petroleum resins, and
   (c) mixtures of (a) and (b),
(2) 0.5 to 4.0% by weight of a plasticizer,
(3) 15 to 60% by weight, on a dry basis, of finely ground vegetable fibers,
(4) 1 to 30% by weight of an inorganic filler,
(5) 1 to 10% by weight of a synthetic rubber, and
(6) a blend of a polypropylene block copolymer and a high density polyethylene making up the remainder, all of the above percentages being based on the weight of said composition.

5. A composition according to claims 1-4 wherein said rosins and products derived from rosins have a softening point of 50°-130° C.

6. A composition according to claims 1-4 wherein said petroleum resins have a softening point of 60°-120° C.

* * * * *